United States Patent [19]

Anderson

[11] Patent Number: 4,658,535
[45] Date of Patent: Apr. 21, 1987

[54] FISHING LURE

[75] Inventor: Vern R. Anderson, Lake Nebagemon, Wis.

[73] Assignee: Cecilia M. Anderson, Lake Nebagemon, Wis.

[21] Appl. No.: 877,155

[22] Filed: Jun. 23, 1986

[51] Int. Cl.⁴ .............................................. A01K 85/00
[52] U.S. Cl. .................................... 43/42.5; 43/42.33; 43/42.34
[58] Field of Search ................. 43/42.32, 42.33, 42.34, 43/42.45, 42.5, 42.52

[56] References Cited

U.S. PATENT DOCUMENTS

| | | | |
|---|---|---|---|
| 1,444,338 | 2/1923 | Doering | 43/42.32 |
| 1,471,280 | 10/1923 | Reefers | 43/42.5 |
| 2,594,673 | 4/1952 | Nichols | 43/42.33 |
| 2,708,806 | 5/1955 | Siebert | 43/42.33 |
| 3,146,543 | 9/1964 | McVay | 43/42.45 |
| 3,676,948 | 7/1972 | Hill | 43/42.45 |
| 3,964,202 | 6/1976 | Ruppa | 43/42.32 |
| 4,499,682 | 2/1985 | Davis et al. | 43/42.52 |

Primary Examiner—M. Jordan
Attorney, Agent, or Firm—Palmatier & Sjoquist

[57] ABSTRACT

The fishing lure has an elongated body with parallel spaced apart top and bottom surfaces. The side surfaces connect with the top surface at an acute angle and with the smaller bottom surface at an obtuse angle. The front and tail areas of the lure connect with the top surface at an angle that is more acute than on the side surfaces of the lure to form an angled perimeter around the lure body. The lure body is also concave about its longitudinal axis to enable the lure to wobble as it passes through the water. The angled edges enable the lure to travel at a variety of angles relative to the direction the lure is retrieved.

6 Claims, 5 Drawing Figures

FISHING LURE

BACKGROUND OF THE INVENTION

This invention is directed to artificial fishing lures and more particularly to spoon-type lures used during jigging or trolling.

There are a great many fishing lures on the market, and they all have varying degrees of success. When the present lures are used for trolling or casting behind the boat they follow a relatively straight line through the water or back to the fisherman. This limits the fisherman to fishing those waters which may be easily reached by casting or trolling. Many lures have angled edges to imitate the swimming motion of a minnow. An example of this type of lure is U.S. Pat. No. 3,146,543, issued to McVay on Sept. 1, 1964. The McVay patent provides a lure which wobbles as it travels through the water in an attempt to attract the fish's attention. Other lures utilize angled sides to control the positioning or depth of the lure as it travels through the water. An example of this type of lure is the Winhaven patent, U.S. Pat. No. 2,981,028, issued on Apr. 25, 1961.

Another common method of fishing is jig fishing. This type of fishing is frequently done in the northern climates during the winter while ice covers the lakes. Jig fishing involves lifting the lure straight upwards and then allowing it to flutter to the bottom. The problem faced by many ice fisherman is that the lure remains directly beneath where they are fishing and if there are no fish directly beneath them, they will not catch anything.

SUMMARY OF THE INVENTION

An object of this invention is to provide a fishing lure which is capable of attracting fish when it is used as a trolling lure or when it is used as a jig type lure.

Another object of this invention is to provide a lure which has angled sides to enable the lure to travel through the water at a variety of angles relative to the direction the lure is retrieved.

Another object of this invention is to provide a lure which is made of reflective material and wobbles as it passes through the water.

The present lure is the result of much time and effort to develop a lure which will imitate the swimming motion of a minnow and will enable the fisherman to fish a larger area than possible with conventional lures. This is accomplished by designing the lure with edges that are angled along the entire perimeter of the lure. As a result of the angled perimeter, the bottom surface of the lure is smaller than the top surface and contributes to the indirect path which the lure follows when it is retrieved. The wobbling motion of the lure is achieved by bending the body of the lure to a concave shape common with spoon type lures.

The body of the lure may have a variety of designs. The two primary shapes are an oblong or elliptical shape and a minnow shape with defined head and tail areas. The front area of the lure is angled from the top surface to the bottom surface at an angle which is smaller than the side angle along the longitudinal center of the lure. The side angles gradually taper to form the bottom surface of the lure. The tail area of the lure is angled similar to the front area of the lure and includes an opening for attachment of a hook to the lure body.

An advantage of the present invention is that it provides a fishing lure which will travel indirectly back to the fisherman instead of traveling directly behind him.

Another advantage of the present lure is that it is easily manufactured and will provide a low cost lure which may be used for many years.

DESCRIPTION OF THE PREFERRED EMBODIMENT

Figure 1:
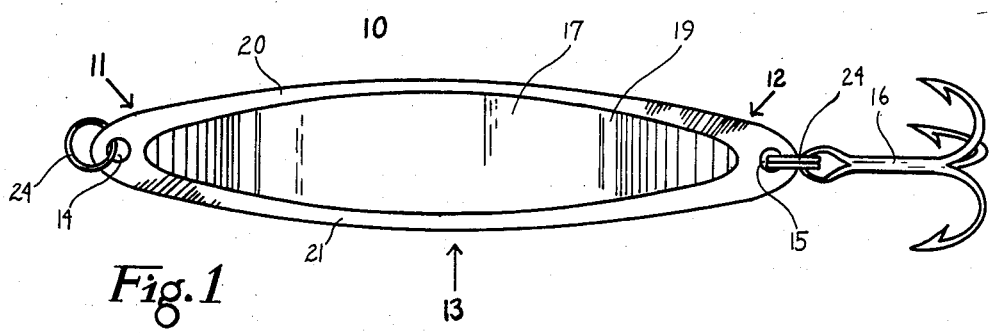
FIG. 1 is a bottom view of the lure.
Figure 2:
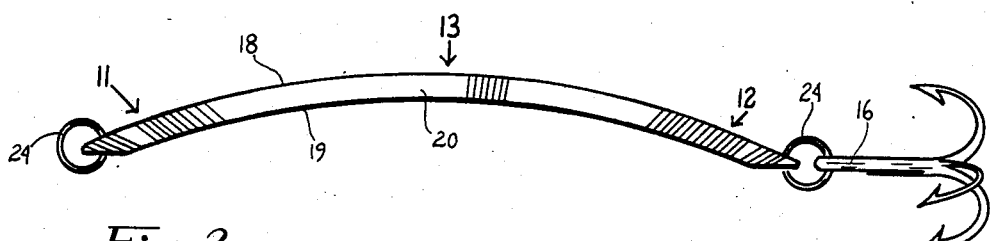
FIG. 2 is a side view of the lure.
Figure 3:
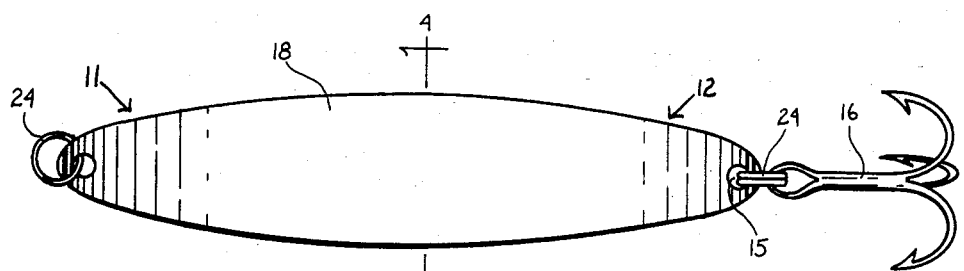
FIG. 3 is a top elevation view of the lure.
Figure 4:
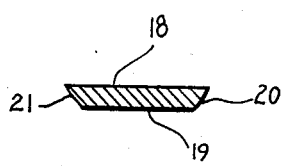
FIG. 4 is a cross section view of the lure taken along lines 4—4 of FIG. 3.
Figure 5:
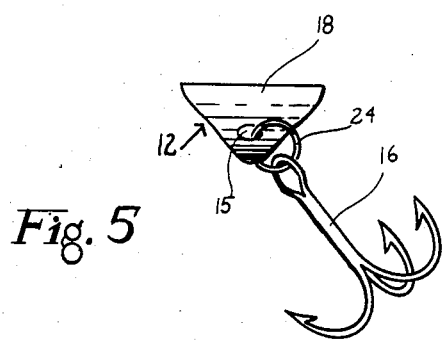
FIG. 5 is an end view of the lure.

The lure is preferably constructed of metal and is finished with smooth reflecting surfaces to reflect light and to attract the attention of the fish. The lure is referred to generally as 10, and consists of a front area 11, a tail area 12 and a body area 13. The front area 11 includes a front opening 14 for attachment of the lure to a swivel or directly to the line. The tail area 12 includes a hook opening 15 through which the hook 16 is attached to the lure 10. The body 13 of the lure 10 is largest at its longitudinal center 17 and tapers to the front 11 and tail areas 12. As shown in FIG. 2, the body 13 of the line 10 is concave to promote the wobbling motion of the lure 10 as it travels through the water. The lure body 13 is relatively thin compared to the length of the lure and maintains a constant thickness throughout its length. It is anticipated that reflective material may be attached to various surfaces of the lure body 13 to increase the reflection of light or to change the color of the lure.

The sides of the lure 10 angle inwardly from the top surface 18 of the lure to the smaller bottom surface 19. The front and tail areas, 11 and 12, of the lure 10 have side edges 20 and 21 which are machined to an angle of approximately 10° to 30°. The angle of the lure body sides 22 and 23 gradually increases from the angle of the front and tail areas, 11 and 12, to an angle of approximately 45° at the longitudinal center 17 of the lure body 13.

The front opening 14 may contain an attachment ring 24 to allow the lure to move freely through the water. The hook opening 15 may also contain an attachment ring 24 to allow the hook 16 to swivel and to facilitate replacement of dull or broken hooks 16.

In operation, the front angle 11 and the side edges 21 and 22 cause the lure 10 to travel through the water differently than with conventional lures. This difference is most obvious when the lure 10 is used for jig fishing. During jig fishing the lure is usually travels straight up and down. With the front angle 11 and the side edges 21 and 22 the lure travels at an angle to the upward pull and then flutters downward from this new location. As a result of the sideways movement of the lure, the fisherman is able to fish a larger area, while remaining in the same location.

A variety of lure body 13 shapes are anticipated and the above description is not intended to be exclusive. The scope of the invention is to be determined by the following claims with reference to the drawings and descriptions being made for the purpose of illustration and interpretation only.

What is claimed:

1. A fishing lure comprising
an elongate lure body having front and tail areas, equidistant reflective smooth top and bottom surfaces, and side surfaces,
said top surface being larger than said bottom surface and said side surfaces being angled inwardly from the larger top surface to the smaller bottom surface at the same acute angles on each side surface,
said front and tail areas having acute angled sides less than the acute angles of the side surfaces of said top and bottom surfaces,
said elongate lure body having a concave longitudinal shape, and
said front and tail areas having openings for attachment of a hook and fishing lure.

2. The fishing lure of claim 1, the acute angles of said front and tail areas are the same.

3. The fishing lure of claim 1, wherein the concave longtiudinal shape is from said bottom surface.

4. The fishing lure of claim 1, wherein the surfaces have reflective material attached thereto.

5. The fishing lure of claim 1, wherein the head and tail areas of said lure body are larger than the longitudinal center of the lure body.

6. The fishing lure of claim 1, wherein the lure body is elliptical with parallel top and bottom surfaces.

* * * * *